United States Patent

Malmstrom

[15] 3,703,296
[45] Nov. 21, 1972

[54] SEALING BETWEEN A ROTARY AND A STATIONARY MEMBER

[72] Inventor: Sven Erik Malmstrom, Peftele, Sweden

[73] Assignee: Forsheda Gummifabrik AB, Forsheda, Sweden

[22] Filed: May 20, 1970

[21] Appl. No.: 37,489

Related U.S. Application Data

[63] Continuation of Ser. No. 709,841, March 1, 1968.

[52] U.S. Cl. .................. 277/25, 277/67, 277/95, 277/63
[51] Int. Cl. ........................ F16j 15/16, F16j 15/42
[58] Field of Search..........277/25, 95, 19, 67, 133, 58

[56] References Cited

UNITED STATES PATENTS

| 2,418,707 | 4/1947 | Groot | 277/25 |
| 2,950,932 | 8/1960 | Gilbert | 277/95 X |
| 2,750,214 | 6/1956 | Bermingham | 277/25 |
| 1,760,463 | 5/1930 | Abenanti | 277/67 |
| 2,888,281 | 5/1959 | Ratti | 277/25 |
| 2,950,932 | 8/1960 | Gilbert | 277/95 X |
| 3,038,733 | 6/1962 | Hudson et al. | 277/95 |

FOREIGN PATENTS OR APPLICATIONS

| 452,314 | 8/1936 | Great Britain | 277/67 |
| 837,814 | 6/1960 | Great Britain | 277/95 |
| 132,925 | 11/1946 | Australia | 277/95 |
| 1,281,462 | 12/1961 | France | 277/95 |

*Primary Examiner*—Samuel B. Rothberg
*Attorney*—Howson & Howson

[57] ABSTRACT

A sealing between a rotary and a stationary member comprises two substantially axially engaging slide rings, one of which is connected to the rotary member while the other is connected to the stationary member. The slide ring connected to the rotary member is provided with at least one passage interconnecting the spaces located on either side of the slide ring.

3 Claims, 6 Drawing Figures

PATENTED NOV 21 1972 3,703,296
SHEET 1 OF 2
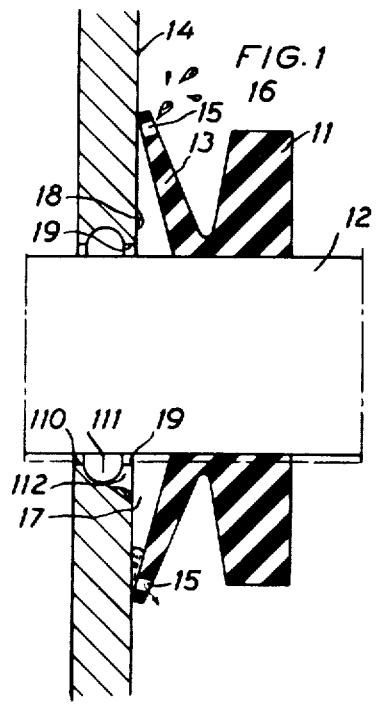
FIG.1
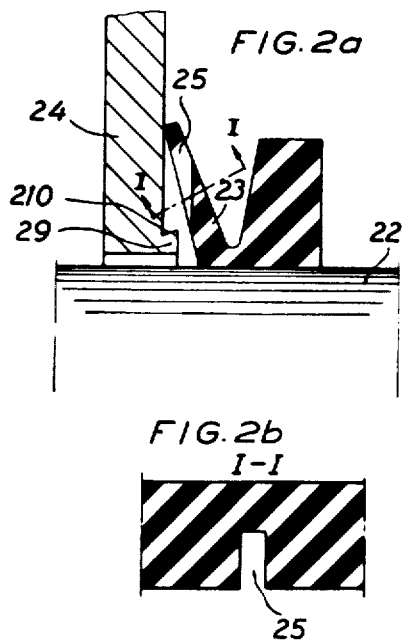
FIG.2a
FIG.2b
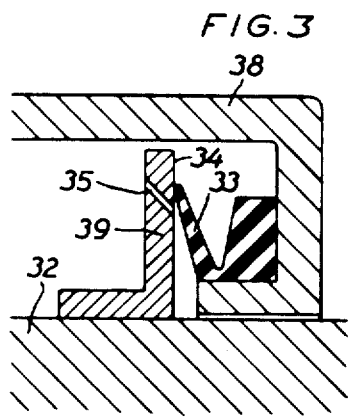
FIG.3
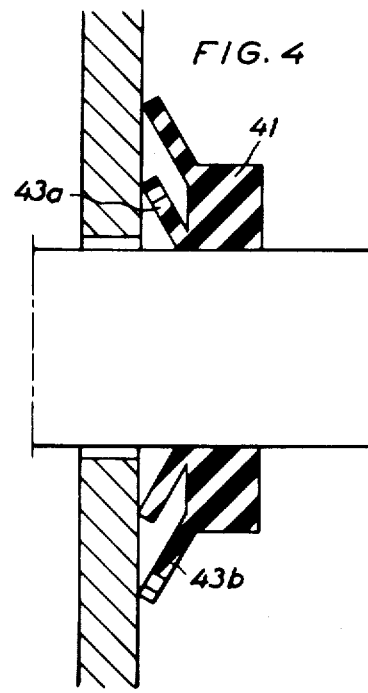
FIG.4
Inventor:
Sven Erik Malmström
by Howson & Howson
Attys.

SEALING BETWEEN A ROTARY AND A STATIONARY MEMBER

This is a continuation of my prior application entitled "Sealing Between A Rotary and A Stationary Member," filed Mar. 1, 1968, under Ser. No. 709,841, now abandoned.

This invention relates to a seal between a rotary and a stationary member.

For a satisfactory function of an oil ring seal which operates under friction and is provided with a sealing lip, a great many requirements have to be satisfied. The lip and the sealing surface which the lip engages must have extraordinarily fine surfaces. The specific pressure of the lip against the sealing surface must be kept within relatively narrow limits. Too high a pressure occasions a high frictional resistance and the risk that the oil film between the lip and the sealing surface will be broken through, from which dry running and abnormal heat development will result. At temperatures over a certain level the rubber will become hard and the decrease in elasticity which unavoidably occurs in a firmly engaged rubber lip is usually compensated for by a temperature-resistant spring element. The specific surface pressure of the sealing lip against the sealing surface must not either be too small since leakage may readily result therefrom.

Recently attention has been paid to a possibility of reducing the surface pressure by exploiting the pumping effect that can be obtained by giving the relatively sliding surfaces a suitable surface structure. Thus one or both surfaces is provided with a spiral or helical groove. Apart from the reduced loss of efficiency in the seal proper one obtains an improved sealing effect because the seal will function as a pump which carries the oil away from the sealing point. An important drawback of this type of seal, however, is that it functions only upon unidirectional rotation. Such seal cannot therefore be used in connections where the shaft rotates in both directions. Moreover, in this type of seal the requirement for a surface of excellent finish remains.

The present invention thus relates to a seal between a rotary and a stationary member comprising two substantially axially engaging slide rings one of which is connected to the rotary member while the other is connected to the stationary member, said slide rings being pressed against each other under a predetermined force.

The characteristic features of the invention reside in that the rotary slide ring has one or more passages therein which interconnect the spaces located on either side of the slide ring.

For elucidating how the above-mentioned drawbacks of prior art seals are overcome by the present invention some embodiments of a seal are described with reference to the accompanying drawings in which:

FIG. 1 is a section of a so-called V-ring mounted on a rotary shaft and embodying the characteristics of the invention;

FIG. 2a is a section of a similar seal of a slightly deviating shape of the passage;

FIG. 2b is a section on line I—I in FIG. 2a;

FIG. 3 is a section of a V-ring mounted on a stationary machine part and engaging a rotary disk;

FIG. 4 is a section of a sealing ring having two lips which both are perforated;

Figure 5:
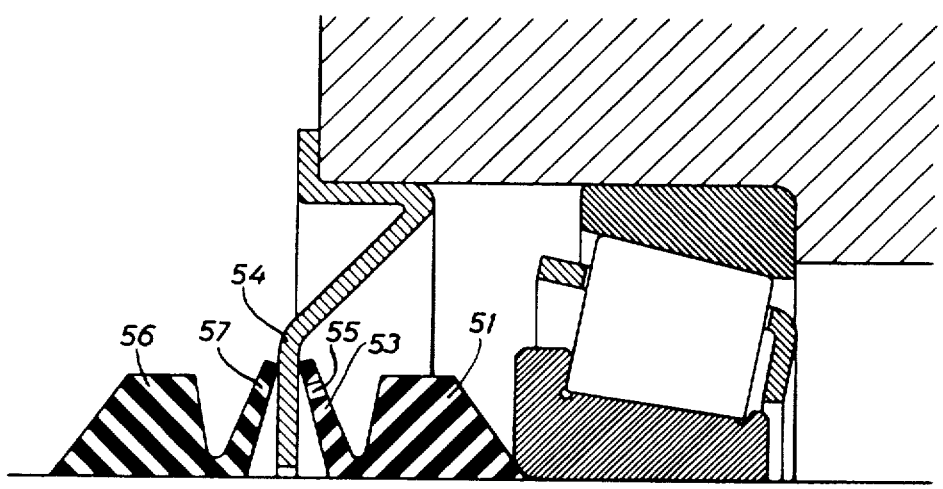
FIG. 5 is a section of a bearing and sealing assembly in which the seal consists of a perforated sealing ring on the inner side of the bearing and a sealing ring having an unbroken lip on the opposite side.

In FIG. 1, 11 designates a so-called V-ring which due to its inherent tension surrounds a rotary shaft 12. The sealing lip 13 of the V-ring engages a sealing surface 14 of a stationary machine part. In the peripheral portion of the sealing lip there are provided one or more apertures 15 which interconnect the spaces 16 and 17 on either side of the lip 13. Considering that the seal has the task of preventing passage of oil or other liquid from the space 16 in which the V-ring is located, to the space 17 on the other side of the sealing wall 14, an aperture leading through the sealing lip 13 and interconnecting the aforementioned spaces would seem contrary to all reason. However, in actual practice circumstances will presumably be as follows. (Since several factors and forces are involved, which are extremely difficult to seize upon, such as adhesion, capillary action, surface tension phenomena, inertia, viscosity, etc., the word "presumably" had to be used here.) In the present instance the space 17 which is the area between the outer face of the lip 13 and surface 14 of the stationary wall defines an air chamber and the area 16 on the opposite side of the lip defines a lubricant chamber. In the form of the invention illustrated in FIGS. 1, 2a and 2b, the highest level of lubricant in the lubricant chamber is below a horizontal plane through the lower extremity of the opening in the stationary member when the parts are at rest to prevent leakage therethrough, as illustrated in the broken line in FIG. 1.

As already mentioned in the foregoing, a given surface pressure is required to keep the thickness of the oil film so small that no leakage arises. At decreasing surface pressure the risk of leakage is great. Of course, it would be advantageous from all points of view if the engaging pressure could be reduced. With the use of seals in accordance with the present invention a considerable reduction of the engaging pressure is permissible in order that a certain amount of leakage oil may pass between the sealing surfaces. For the leakage oil is returned through the aperture 15 to the space 16. The aperture 15 being so large that the capillary force, adhesion and surface tension taken together will be smaller than the centrifugal force acting upon the oil, such return of the oil can take place through said aperture. On the other hand, no such return of leakage oil can take place through the gap between the sealing lip and the sealing surface in conventional seals, for in that case the centrifugal force is inferior.

It is diagrammatically illustrated in FIG. 1 how the return of oil may take place. Should a droplet 18 not be caught directly by the lip it will slide down the wall 14 to the circular edge 19 and follow this edge to the lowermost point of the seal where it is infallibly caught and thrown through the aperture 15 as indicated by the arrow. In the case outlined it is important that the diameter of the edge 19 be so much larger than the shaft that an oil droplet cannot be caught by the shaft and flow outwardly along it. The sealing wall about the shaft is designed in a special manner. Between the edge 19 and an edge 110 on the opposite side of the wall 15 and of substantially the same diameter there is provided an annular space 111 which has a considerably larger diameter than the edges 19 and 110. Oil collecting in the space 111 is discharged through a passage 112.

FIGS. 2a and 2b illustrate an embodiment which does not essentially differ from that earlier described. The difference resides only in the design and localization of the passage 25. It has been given a more radial direction than the aperture 15 in FIG. 1, and it is in the form of a gap (see FIG. 2b) and wider at the inlet than at the outlet to provide a better catching effect and a stronger discharging effect.

The portion of the sealing wall 24 closest to the shaft 22 is provided with an edge 29 which projects towards the sealing lip 23 and has the task of preventing oil following the sealing wall 24 from coming in contact with the shaft. An outer conical surface of restriction 210 on said edge 29 eliminates every possibility of such contact.

FIG. 3 illustrates a sealing in which the V-ring is mounted on a stationary machine part 38, such as a bearing housing. The lip 33 engages a flat surface 34 of a disk 39 which is mounted on the rotary shaft 32. The disk 39 has a hole 35 whose function entirely agrees with that of the earlier described apertures and passages in the sealing lips. As will have been realized from the specification these passages may be varied in both appearance and number. It is a simple matter empirically to establish the best sealing effect for various sealing cases, once the sealing principle as such has become known. A seal in accordance with the present invention has the following outstanding advantages:

1. In the absence of pressure the seal is absolutely tight, regardless of rpm and direction of rotation.

2. All requirements for a fine finish of the sealing surface are dispensed with. A surface finish of up to 50 μ is fully sufficient. Sharp burrs should of course be removed, but the profile depth in itself is of subordinated importance.

3. The absence of pressure required under item 1 is automatically provided by the pressure equalization that occurs through the passage in the sealing lip. The venthole necessary for most closed machine components such as gear cases, bearing housings and variators, is not necessary any more with the use of seals according to the present invention.

4. The engagement pressure can be kept at a minimum, which implies that friction losses and additional heat can be reduced to a fraction of what has earlier been regarded as normal.

5. Should the seal be obliged to work under high heat and, as a consequence, the rubber should harden and the lip crack, the seal will nevertheless function in a reliable manner since a minor oil leakage is even preferable.

However, a drawback is inherent in seals according to the invention, as the seal cannot be used when the oil level at standstill reaches the edge 19 (see FIG. 1) or even higher. At a level close to the shaft axis the arrangement shown in FIG. 4 may offer a solution.

The sealing ring 41 here has two lips 43a and 43b each having an aperture diametrically located in relation to that of the other lip. Irrespective of the position of the shaft at standstill the seal will be tight at an oil level slightly below the shaft axis.

One solution is to leave the inner lip 43a intact, that is to say without any aperture.

An alternative and better solution of the problem of a high oil level is illustrated in FIG. 5. A sealing ring 51 having a lip 53 with a passage 55 therein, which lip engages a sealing wall 54, is supplemented with a sealing ring 56 located on the other side of the wall and having an intact sealing lip 57.

In the foregoing specification there have been employed alternately the terms "(sealing)lip and (sealing) surface" and "rotary and stationary slide ring" which in point of function are synonymous. The terms "sealing lip and sealing surface" are used for describing sealing elements of rubber while the term "rotary and stationary slide ring" should be interpreted quite generally without regard to any special type of seal.

I claim:

1. In combination, a stationary member having inner and outer walls and an opening therein, a rotatable member extending through said opening, a seal mounted on said rotatable member having a flexible, circumferentially extending lip engaging the inner wall portion surrounding the opening in said stationary member and defining a circumferential contact zone therebetween, the area between the outer surface of said lip and said inner wall of said stationary member defining an air chamber, the area on the opposite side of said lip defining a lubricant chamber, the highest level of lubricant in said lubricant chamber being not greater than a horizontal plane through the lowest extremity of the opening in said stationary member when the parts are at rest, collector means on said stationary member for collecting lubricant leaking past said contact zone and flowing therefrom along said wall in the direction of said opening out of contact with said lip, director means for directing the lubricant collected by said collector means into contact with said lip, means defining at least one aperture in said lip adjacent the outer terminal edge thereof extending between said air chamber and said lubricant chamber and disposed at an angle relative to the axis of rotation of said rotatable member, the centrifugal force upon rotation of said rotatable member acting on lubricant contacting said outer surface of said lip radially inwardly of said contact zone to evacuate said lubricant through said aperture back to said lubricant chamber, said aperture being of a size whereby the capillary force, adhesion and surface tension combined is less than the centrifugal force acting on lubricant flowing radially inwardly along said inner wall past said contact zone, said aperture of said rotational member being disposed in each cycle of rotation above the lubricant level in said lubricant chamber thereby preventing pressure buildup in said lubricant chamber.

2. The combination as claimed in claim 1 wherein said collector means comprises means defining in the opening in said stationary member an enlarged circumferentially extending groove between said inner and outer walls of said stationary member and said director means comprises means defining a passage communicating with said groove and said air chamber.

3. The combination as claimed in claim 1 wherein said collector means and said director means comprises a circumferentially extending projection on said stationary member, which projects towards said flexible lip and has an outer conisurface.

* * * * *